Dec. 17, 1963  A. K. MORTIN ETAL  3,114,357
VAPORIZING DEVICE FOR LPG ENGINES
Filed Nov. 1, 1961  2 Sheets-Sheet 2
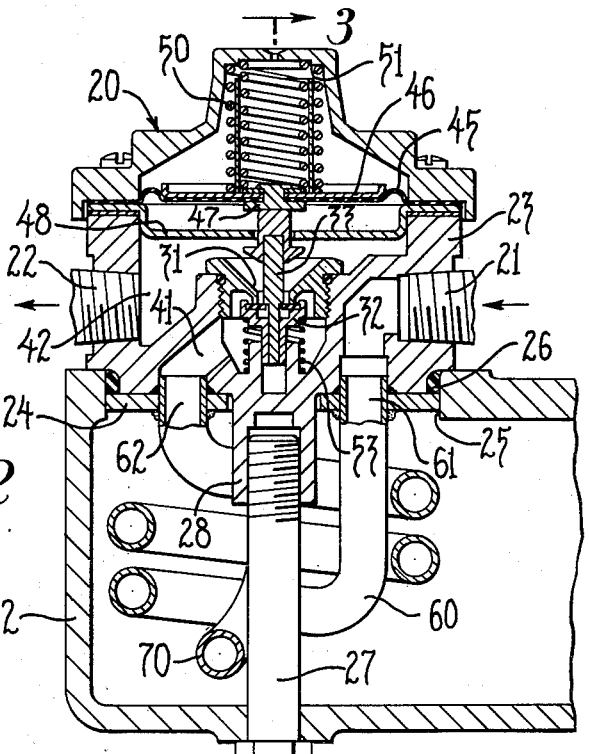
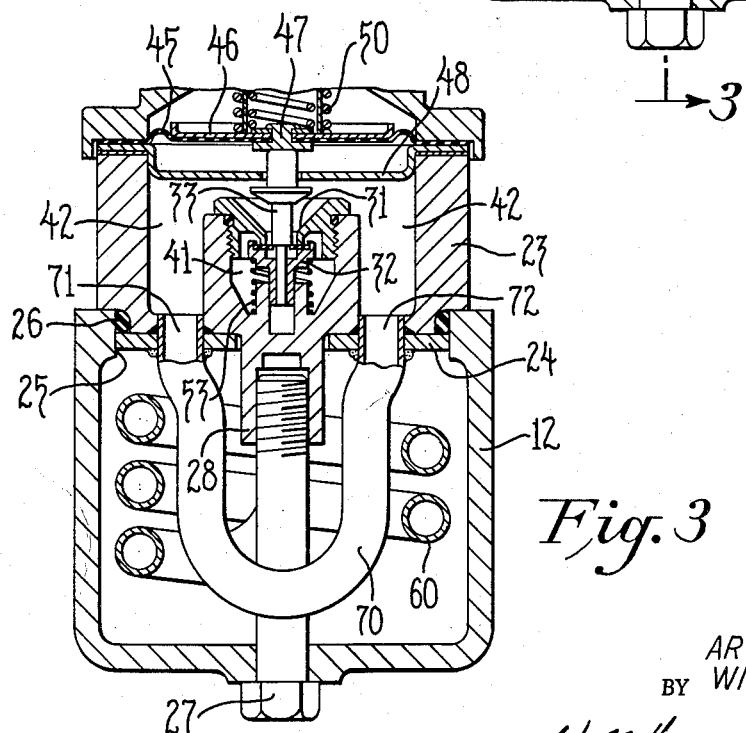
INVENTORS.
ARTHUR K. MORTIN &
BY WILLIAM D. BOYD
ATTORNEYS.

United States Patent Office 3,114,357
Patented Dec. 17, 1963

3,114,357
VAPORIZING DEVICE FOR LPG ENGINES
Arthur K. Mortin, Oak Park, and William D. Boyd, Detroit, Mich.; said Mortin assignor to Massey-Ferguson Inc., Detroit, Mich., a corporation of Maryland, and said Boyd assignor to The Bendix Corporation, Detroit, Mich., a corporation of Delaware
Filed Nov. 1, 1961, Ser. No. 149,456
7 Claims. (Cl. 123—120)

The present invention relates to a device for vaporizing liquified gaseous fuel and more particularly for vaporizing fuel for use in water cooled internal combustion engines.

In a conventional vaporizing system for an engine employing liquified petroleum gas or "LPG," a pressure reducing valve is used to convert the fuel from the liquid to the gaseous state. Prior to passing through the pressure reducing valve the liquified gas flows through a heat transfer coil which is immersed in the water of the engine cooling system. This serves to warm the liquified gas so that when it is vaporized or expanded in the pressure reducing valve it is totally in the vapor phase ready for use by the "mixer" or carburetor where the gas is mixed with atmospheric air for combustion in the cylinders of the engine.

It is found, however, that under extremely cold ambient conditions, for example, zero degrees Fahrenheit, vaporization is incomplete. Sufficient gas forms in the valve and connecting line to start the engine, but after a few seconds of operation the fuel is supplied to the mixer in liquid form and the engine chokes out because of the excess.

Accordingly it is an object of the present invention to provide a vaporizing arrangement for use with an internal combustion engine which insures that liquified fuel gas is reliably transformed into the vapor form even under extremely low ambient temperature conditions.

It is another object of the present invention to provide a vaporizing device which includes special provision for facilitating starting in low ambient temperatures but which is simply constructed and which costs only slightly more to manufacture than vaporizing devices of conventional design. It is a related object to provide a vaporizing device of the above type which is self-contained and compact with the parts being integrated in a novel way. It is also an object to provide an improvement for a vaporizing device which is applicable to conventional vaporizers economically and with only minor structural change.

In one of the aspects of the invention it is an object to provide a vaporizing device having a low temperature vaporizing feature which comes into operation only when conditions require it and which does not otherwise affect the operation of the components normally provided in devices of this kind.

Other features and advantages of the invention will become apparent upon reading the attached detailed description and upon reference to the drawings in which:

FIG. 2 is a vertical section taken through the vaporizing device and the associated portion of the engine cooling system along the line 2—2 in FIG. 1; and FIG. 3 is a vertical section taken through the vaporizing device at right angles to the section shown in FIG. 2, along the line 3—3 in the latter figure.

Figure 1:
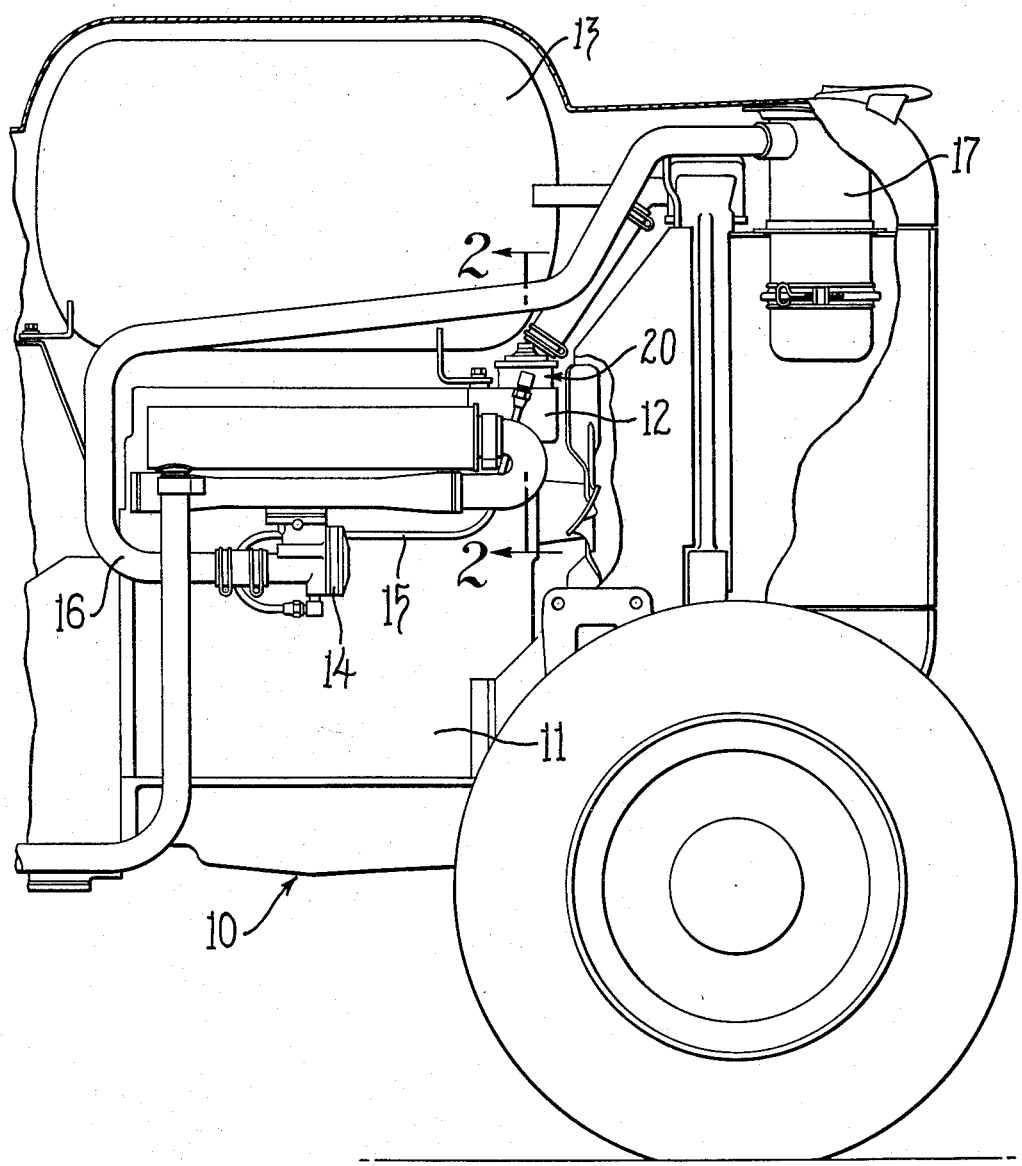
FIGURE 1 is a sectional view of the front end of a tractor incorporating a vaporizing device embodying the present invention.

While the invention has been described in connection with a preferred embodiment, it will be understood that the invention is not limited to the embodiment shown but, on the contrary, we intend to cover the various equivalent and alternative constructions included within the spirit and scope of the appended claims.

Turning now to FIGURE 1, there is shown the front end of a tractor 10 having an engine 11. The engine is preferably of the type having a water cooling system including a water jacket 12. Arranged above the engine is a fuel tank 13 containing liquified gaseous fuel commonly referred to as "LPG." For the purpose of mixing the fuel with air, a mixer or carburetor is provided having a fuel line 15 and receiving air through an air line 16 fed from an air intake and air cleaner 17.

Interposed between the fuel tank 13 and the mixer 14 is a vaporizer 20 for the purpose of converting the gas from the liquified form to gaseous form for use by the mixer.

Referring to FIGS. 2 and 3, the vaporizing device 20 has an inlet 21 and an outlet 22 formed in a valve body 23. In the preferred form of the invention the valve body is mounted on a mounting plate 24 which is fitted in an opening 25 in the water jacket 12 of the engine. For sealing the valve body and mounting plate in the opening 25, an O-ring 26 is used. To maintain the vaporizing device in its seated and sealed position, a drawbolt 27 projects through the water jacket for threaded engagement with an extension 28 formed on the underside of the valve body.

Referring ot the construction of the vaporizing device in greater detail it will be noted that it is, in its simplest aspect, a pressure reducing valve having a centrally located valve seat 31 cooperating with a valve plunger 32 connected to a valve stem 33. The valve seat and valve plunger effectively divide the valve into two chambers, a high pressure chamber 41 and a low pressure chamber 42.

For the purpose of controlling admission of fuel from the high pressure chamber to the low pressure chamber with throttling action and to maintain a constant low pressure on the low pressure side, a diaphragm and control spring are employed acting jointly upon the valve stem 33, as is common in valves of the reducing or regulating type. Thus, extending across the top of the low pressure chamber 42 and sealingly clamped about its edges is a flexible diaphragm 45, the central portion of which is reinforced by a diaphragm plate 46. Centrally mounted on the diaphragm is a pressure pad 47 which engages the upper end of the valve stem 33. Adjacent the diaphragm is a fixed plate 48 to limit downward movement. Bearing downwardly upon the diaphragm plate 46 is a control spring 50, the upper end of which is seated in the upper extremity 51 of the valve body. In order to keep the valve stem 33 seated on the pad 47 to follow movement of the diaphragm, a light auxiliary spring 53 surrounds the lower end of the valve stem and presses upwardly thereon.

The operation of the device as thus far described will be apparent to one skilled in the art. The control spring 50 presses downwardly upon the diaphragm and valve stem 33 unseating the valve plunger 32 so that flow may take place from the high pressure chamber 41 to the low pressure chamber 42. However, as soon as the pressure on the low pressure side builds up to a value which is just slightly above atmospheric, such pressure, applied to the diaphragm 45, compresses the spring 50 resulting in upward movement of the valve stem 33 to bring the valve plunger 32 close to the seat 31. Throttling occurs at the valve seat, with just enough gas being liberated to maintain the desired low pressure in the low pressure chamber. When the engine calls for more fuel, tending to produce a drop in the pressure in the chamber 42, the valve plunger is additionally cracked open; when the demand decreases, the valve plunger tends to close. Thus the device seeks constantly to establish a condition of equilibrium.

For the purpose of insuring that the fuel at the output of the vaporizer is in the vapor phase under normal running conditions, a heat transfer coil 60 having an inlet 61 and an outlet 62 is interposed in the liquid flow line just ahead of the high pressure chamber of the vaporizer, with the coil being submerged in the cooling water in the water jacket 12. Since the water in the water jacket 12 is normally above ambient temperature, a substantial quantity of heat is absorbed by the liquid fuel in transit, raising its temperature so that when the liquid passes through the throttling valve members it is totally in vaporized form on the low pressure side. The coil 60 is preferably in the form of a helix of three turns or so centered on the vertical axis and with its ends brazed or otherwise secured to the mounting plate 24.

In accordance with the present invention, a heat exchange trap is provided in communication with the low pressure or output chamber of the vaporizer and arranged in contact with a source of heat so that any fuel which may exist in the liquid phase is collected in the trap for vaporization by transfer of heat, with the result that the fuel supplied to the line feeding the mixer is completely in the gaseous phase even under low ambient conditions. Further in accordance with the present invention, the heat exchange trap at the output side of the vaporizer comprises a coil or loop immersed in the fluid in the engine cooling system. In the present instance the trap, indicated at 70, is in the form of a U-shaped loop which extends down into the cooling medium and with the upper ends 71, 72 thereof being secured to the mounting plate 24 and in communication with the output or lowput pressure chamber 42 of the pressure reducing valve. Preferably the open ends of the trap are made flush with the bottom of the chamber 42 (FIG. 3) so that whatever fuel may exist in the liquid state is quickly drained into the trap by action of gravity.

For operation in low ambient temperatures, the cooling medium will normally be a water mixture including a suitable percentage of anti-freeze. It is found that a relatively short length of tubing 70, connected as shown, produces sufficient auxiliary vaporization to take care of the starting condition of the engine in the coldest weather, for example, when the water anti-freeze mix from which the heat is derived, is at zero degrees F. or less.

In operation at a low temperature liquid fuel flows under pressure into the inlet 21, through the heat transfer coil 60, and into the high pressure chamber 41 of the valve. Since the valve is initially held open by the spring 50, the liquid fuel is throttled between the valve surfaces into the low pressure chamber 42. When the ambient temperature is at an assumed zero degrees F., the liquified gas supplied to the high pressure side of the pressure reducing valve will also be at zero degrees. Because of the expansion which takes place incident to throttling, the fuel at the outlet or low pressure side of the pressure reducing valve will be at a temperature which is even lower than ambient, a temperature which is so low that fuel may exist partially in liquid phase notwithstanding the reduction in pressure. Any liquid fuel in the chamber 42 quickly drains down into the trap 70 where it is in good thermal contact with the cooling water. While the temperature of the cooling water is low, it is nevertheless warmer than the liquid phase fuel so that heat tends to flow from the cooling water into the fuel in the trap, causing it to bubble away as it is transformed from liquid to vapor phase. The vapor thus produced flows through the outlet 22 of the pressure reducing valve and into the mixer where it is mixed with atmospheric air for operation of the engine. Thus, because of the above heat transferring trap arrangement, flooding of the mixer with liquid fuel under cold starting conditions is avoided.

After the engine operates for a short time, the temperature of the cooling water is raised, raising the temperature of the liquified fuel in the heat transfer coil 60. This insures that the temperature of the throttled fuel will be sufficiently high so that the fuel on the low pressure side of the valve will be in the gaseous state. Thus, under running conditions, there will be no liquid fuel to drain down into the trap 70. Accordingly, the trap becomes inoperative when not required and the use of the present improvement is not accompanied by any sacrifice of efficiency under normal running conditions.

It will be apparent from the drawing that the vaporizer, including the present improvement, is compact and with the components well integrated. The trap 70, being centered within the hollow coil 60, is protected physically and occupies space previously unused so that there is no substantial increase in the overall physical dimensions. Consequently, vaporizers of the new design may be used interchangeably with vaporizers of conventional type without requiring any modification or enlargement of the water jacket, without modification or re-running of the engine fuel lines, and without adjustment of carburetion.

Moreover, the construction is so simple that vaporizers including the present improvement may be manufactured for only a few cents more than the cost of manufacturing existing designs, and, if desired, the improvement may be added to existing designs with only minor modification.

It is found that the simple U tube arrangement has high thermal transfer capacity. Any fuel which is in the vapor state passes directly out of low pressure chamber 42 to the mixer. Only that part which is in the liquid phase falls into the trap 70 from whence it bubbles up in gaseous form through either of the two legs of the U. It will be apparent that a simple cup or other form of trap could be used in place of the U tube.

While the invention has been described in connection with use of a trap close-coupled to the valve body and in contact with the cooling water of the engine, it will be apparent to one skilled in the art that the trap may, if desired, be located anywhere in the low pressure line associated with the output 22, and the source of heat, if desired, need not be the cooling water but may be any other source of heat at ambient temperature in good thermal coupling with the liquid fuel contained in the trap.

In the above discussion it is then assumed that the vaporizer is adjusted so that the pressure at the output is just slightly above atmospheric pressure. In accordance with the usual automotive practice, a second pressure reducing valve may be employed at the mixer 14 to reduce the gas pressure still further as required for mixing and aspiration into the cylinders of the engine.

We claim as our invention:

1. In a vaporizing device for vaporizing liquified gas for supplying to an internal combustion engine having a mixing device for mixing air therewith, and having a fluid cooling system, the combination comprising a pressure reducing valve having an input and an output so adjusted that the gas produced at the output is substantially at atmospheric pressure, a source of liquified gas, a first heat transfer coil communicating with the valve input, and a second heat transfer coil in communication with the valve output and arranged below the valve to drain off any liquified gas which may exist at the output, said coils being thermally coupled to a source of engine derived heat so that the heat from the latter is effective to convert the liquified gas in the second coil from liquid to gaseous state under low ambient starting conditions.

2. A vaporizing arrangement for vaporizing liquified gaseous fuel for use with an internal combustion engine having a mixer and a source of liquified fuel gas, the combination comprising a pressure reducing valve having an input and an output, first and second heat transfer coils being coupled to a source of heat, said first heat transfer coil being located between the input of the pressure reducing valve and the source of liquified gas, the second heat transfer coil being connected to the output of the pressure reducing valve so that any fuel which is in liquified form at the output of said reducing valve may absorb heat from said source of heat for conversion from the liquid to gaseous state thereby to insure that the fuel supplied to the mixer is in a gaseous state.

3. In a vaporizing arrangement for vaporizing liquified fuel gas for use with an internal combustion engine having a mixer, the combination comprising a source of liquified fuel gas, a pressure reducing valve including a body having a high pressure chamber and a low pressure chamber as well as control means for throttling from one to the other, means for mounting the valve body adjacent a source of engine derived heat, a heat transfer coil being adapted to be coupled to a source of engine derived heat, said heat transfer coil having its input arranged for connection to the source of liquified fuel gas and its output connected to the high pressure chamber of said reducing valve so that under normal running conditions of the engine the liquified fuel gas fed to said reducing valve is warmed to a temperature such that immediate vaporization takes place as the fuel is throttled from the high pressure chamber to the low pressure chamber, a trap being adapted to be coupled to a source of engine derived heat and communicating with the low pressure chamber so that under low ambient starting conditions any fuel which may exist in liquid form in the low pressure chamber flows into said trap for vaporization thereby insuring that the fuel is supplied to the mixer in gaseous form.

4. In a vaporizing arrangement for vaporizing liquified fuel gas for use with an internal combustion engine having a mixer, the combination comprising a source of liquified fuel gas, a pressure reducing valve including a body having a high pressure chamber and a low pressure chamber as well as control means for throttling from one to the other, a heat transfer coil adapted to be coupled to a source of engine derived heat, said heat transfer coil having its input arranged for connection to the source of liquified fuel gas and its output connected to the high pressure chamber of said reducing valve so that under normal running conditions of the engine the liquified fuel gas fed to said reducing valve is warmed to a temperature such that immediate vaporization takes place as the fuel is throttled from the high pressure chamber to the low pressure chamber, a trap adapted to be coupled to a source of engine derived heat, said trap being in the form of a U shaped loop of tubing having both of its ends communicating with the low pressure chamber so that under low ambient starting conditions any fuel which may exist in liquid form in the low pressure chamber flows into said trap for vaporization so that the fuel is supplied to the mixer in gaseous form.

5. In a vaporizing device for vaporizing liquified gas for supplying to the mixer of an internal combustion engine, the combination comprising a source of liquified gas, a pressure reducing valve having an inlet and an outlet for receiving liquified gas from the source and for discharging it at substantially atmospheric pressure, a first heat transfer element communicating with the valve inlet for conducting the liquified gas and in heat transferring relation to a source of engine derived head, and a second heat transfer element communicating with the valve outlet and in heat transferring relation to a source of engine derived heat thereby to insure that fuel supplied to the mixer is in the gaseous state under low ambient starting conditions.

6. In a vaporizing arrangement for vaporizing liquified fuel gas, the combination comprising, a pressure reducing valve including a body having a high pressure chamber and a low pressure chamber as well as control means for throttling from one to the other, a heat transfer coil having its input arranged for connection to a source of liquified fuel gas and its output connected to the high pressure chamber of said reducing valve, a trap communicating with the low pressure chamber for draining any liquid therefrom, said coil and said trap both being coupled to a source of heat to insure that the fuel at the output is in gaseous form under all ambient temperature conditions.

7. In a vaporizing arrangement for vaporizing liquified fuel gas for use with an internal combustion engine having a mixer and having a source of engine derived heat, the combination comprising a source of liquified fuel gas, a pressure reducing valve including a body having a high pressure chamber and a low pressure chamber as well as control means for throttling from one to the other, means for mounting the reducing valve body on said internal combustion engine adjacent said source of heat, a heat transfer coil of generally hollow shape secured to the valve body and coupled to said source of heat, said heat transfer coil having its input arranged for connection to the source of liquified fuel gas and its output connected to the high pressure chamber of said reducing valve so that under normal running conditions of the engine the liquified fuel gas fed to said reducing valve is warmed to a temperature such that immediate vaporization takes place as the fuel is throttled from the high pressure chamber to the low pressure chamber, a trap coupled to said source of heat and communicating with the low pressure chamber so that under cold starting conditions any fuel which may exist in liquid form in the low pressure chamber drains into said trap for vaporization so that the fuel is supplied to the mixer in gaseous form, said trap being secured to the valve body and contained substantially within the hollow confines of the heat transfer coil.

References Cited in the file of this patent

UNITED STATES PATENTS

| | | |
|---|---|---|
| 2,475,086 | Ensign | July 5, 1949 |
| 2,752,758 | Tann | July 3, 1956 |
| 2,988,075 | Ensign | June 13, 1961 |